United States Patent [19]

Hayashi et al.

[11] Patent Number: 5,529,720
[45] Date of Patent: Jun. 25, 1996

[54] LOW-RESISTANCE CONDUCTIVE PIGMENT AND METHOD OF MANUFACTURING SAME

[75] Inventors: Toshiharu Hayashi; Masahiro Sekiguchi; Akira Nishihara, all of Saitama-ken, Japan

[73] Assignee: Mitsubishi Materials Corporation, Tokyo, Japan

[21] Appl. No.: 174,225

[22] Filed: Dec. 28, 1993

[30] Foreign Application Priority Data

| Dec. 28, 1992 | [JP] | Japan | 4-360428 |
| Dec. 28, 1992 | [JP] | Japan | 4-360429 |
| Dec. 28, 1992 | [JP] | Japan | 4-360430 |
| Dec. 8, 1993  | [JP] | Japan | 5-308320 |

[51] Int. Cl.$^6$ ............... C04B 14/30; C09C 1/62; H01B 1/08; C08K 3/22
[52] U.S. Cl. ............. 252/518; 106/400; 106/403; 423/593
[58] Field of Search ............... 106/400, 403; 423/593; 252/500, 518

[56] References Cited

U.S. PATENT DOCUMENTS 4,594,182  10/1986  Hashimoto et al. .............. 252/518

FOREIGN PATENT DOCUMENTS

| 0006761 | 2/1982 | Japan | 252/518 |
| 0067674 | 4/1982 | Japan | 252/518 |
| 0100023 | 4/1989 | Japan | 252/518 |

*Primary Examiner*—Peter A. Szekely
*Attorney, Agent, or Firm*—Morrison Law Firm

[57] ABSTRACT

A low resistance conductive pigment containing indium oxide crystal grains each including a partial amount of Sn. The amount of Sn ranges from about 1 to about 15 mol % relative to the total amount of Sn and In in each of the indium oxide crystal grains. The conductive pigment further includes a specified surface acidity and a specified volume resistivity. The conductive pigment exhibits improved visibility and averages a primary particle size of up to 0.2 μm. This allows for the manufacture of superior transparent conductive films which can be useful, inter alia, as a transparent electrode in liquid crystal displays and heating elements having transparent surfaces. In one embodiment, ITO crystals undergo an oxygen extraction treatment, while in another embodiment, surface acidity, is increased by a surface modification treatment. The methods of forming conductive pigments, conductive film forming compositions and conductive resin forming compositions are also disclosed.

13 Claims, No Drawings

LOW-RESISTANCE CONDUCTIVE PIGMENT AND METHOD OF MANUFACTURING SAME

BACKGROUND OF THE INVENTION

The present invention relates to a conductive pigment including indium oxide, which contains tin (hereinafter referred to as "ITO") crystal grains (said pigment is hereinafter also referred to as ITO pigment), a method of manufacturing same and applications thereof.

More particularly, the present invention relates to a conductive ITO pigment having low resistance, and preferably, an improved color tone as compared with the conventional ITO pigments, a method of manufacturing same and applications thereof.

The conductive pigment of the present invention is suitable for forming a conductive film by mixing with one of a paint and ink. Particularly, by using an ITO pigment having an average primary particle size of up to 0.2 µm, a transparent conductive film useful as a transparent electrode or a transparent heating plate is made available. By kneading the conductive pigment of the present invention with a resin, it is possible to manufacture a conductive resin.

Prior art methods of manufacturing transparent conductive film included depositing a metal or an inorganic oxide on a glass or resin substrate by a vapor deposition method such as vacuum deposition, sputtering or ion plating.

Compared to other prior art conductive films, it is preferable to use an ITO film due to its superior transparency, conductivity and stability. Moreover, an ITO film exhibits excellent etching properties when used with acids (acid solubility). It is therefore, used in such applications as a transparent electrode in a liquid crystal display.

Prior art vapor deposition methods have various drawbacks. Chief among them is the exorbitant cost associated with the apparatus required to practice the method. Essentially, the vapor deposition method is expensive to practice because it requires very expensive apparatus for producing a high vacuum (highly reduced pressure). This feature substantially increases the cost of the method.

Another drawback, common to prior art vapor deposition methods is the low productivity associated with such batch-type operations. This method is also unable to yield large area films.

An additional drawback associated with an ITO thin film formed by the vapor deposition method, is the appearance of a yellowish tint. This yellow tint has been implicated with low visibility, which in turn, makes it difficult to manufacture high transparency films.

The sputtering method is the most commonly used prior art method for thin film processing. However, the major drawback associated with this method is the short life span of the ITO target, which leads to a low utilization rate of about 35 to 40%.

In particular, when etching thin films to produce circuits for electrodes, the yield is substantially decreased by the amount of the material removed. As a result, a substantial amount of expensive Indium is discarded without being effectively utilized. This drawback results in wasted Indium, which increases the cost of practicing this process.

Prior art methods of manufacturing ITO pigments include reacting a mixed aqueous solution containing a water-soluble $Sn^{4+}$ or $Sn^{2+}$ compound and an $In^{3+}$ compound with an aqueous alkaline solution. This is followed by calcining the resultory co-precipitated hydroxides of Sn and In (precursor hydroxides of ITO pigment) in open air effective to convert the hydroxides into oxides. This method is suitable for industrially manufacturing stable low-resistance ITO pigment.

However, the ITO pigment manufactured by this method exhibits volume resistivity on a scale of 50 kg/cm² with the green compact test yielding only $2 \times 10^1$ to $2 \times 10^0$ Ω.cm about four digits as high as $1 \times 10^{-3}$ to $2 \times 10^{-4}$ Ω.cm of the already commercially applied sputtering thin film. Even by trying to achieve a higher purity by limiting the concentration of $Cl^-$ ion contained in the ITO pigment, this method is poorer in relation to the objects of the present invention. See proposed Japanese Laid Open Patent Publication No. 5-201,731.

Even by forming a transparent conductive film from a paint or ink containing such an ITO pigment, the resultory thin film exhibits excessively high surface resistance. This drawback makes it impossible to form a sufficient conductive thin film which would permit industrialization as a transparent electrode.

Additionally, conventional ITO pigments exhibit a yellowish tint. This feature, in turn, imparts a yellow tint to transparent conductive films, leading to a poor visibility.

In sum, the present invention aims at providing a transparent conductive pigment for use in circuits, for example which can serve as an electrode by preparing a paint or ink using an ITO pigment. The ITO pigment that can be used for such purposes is characterized by having a conductive pigment having an average primary particle size of up to half the wave length of visible rays (i.e., up to 0.2 µm) which can be applied or printed onto a substrate.

The present inventors have discovered that modifying the surface of an ITO pigment, (surface modification step), wherein the surface is made more acidic, provides for an improved volume resistivity measured at under $2 \times 10^0$ Ω.cm. Additionally, an increase in the oxygen vacancy of the ITO pigments, by means of an oxygen extraction step, substantially improves conductivity and increases the volume resistivity to up to $8 \times 10^{-1}$ Ω.cm while simultaneously improving the visibility of the pigment by changing conventional yellow tint to one of blue and grey-blue tint.

The above achievements are further enhanced when the oxygen extraction step is combined simultaneously with the surface modification step. This combination effectively lowers the resistivity of the pigment to a range of from $8 \times 10^{-2}$ to $9 \times 10^{-5}$ Ω.cm while simultaneously improving the visibility of the pigment by changing the yellow tint to a bluish tint.

The present invention aims at solving the above-mentioned drawbacks associated with prior art ITO pigments and methods of manufacturing same. The present invention also aims at achieving the aforementioned discoveries by providing a low cost method of manufacturing conductive pigments.

Additionally, the present invention provides for a cheaper method of producing superior transparent large area films without wasting expensive Indium while simultaneously increasing the yield of the conductive pigments and films. The present invention provides a low-cost alternative to producing high yields of films on a large-scale with minimal waste of expensive indium.

OBJECTS AND SUMMARY OF THE INVENTION

It is an object of the present invention, to provide an ITO pigment exhibiting a lower resistance than conventional ITO pigments.

It is a still further object of the present invention to provide an ITO pigment having a volume resistivity, in the form of 50 kg/cm² green compact, of under $2 \times 10^0$ $\Omega$.cm.

It is a still further object of the invention to provide an ITO pigment characterized by a volume resistivity, in the form of 50 Kg/cm² green compact, of up to $8 \times 10^{-1}$ $\Omega$.cm.

It is a still further object of the invention to provide an ITO pigment characterized by a volume resistivity, in the form of 50 Kg/cm² green compact, of up to $8 \times 10^{-2}$ to $9 \times 10^{-5}$ $\Omega$.cm which is comparable with that of a sputtering thin film and a method of manufacturing same.

It is a still further object of the invention to provide an ITO pigment with a blue tint so as to permit formation of a transparent conductive film exhibiting excellent visibility, and a method of manufacturing same.

It is a still further object of the invention to provide a conductive film forming composition and a conductive resin forming composition containing an ITO pigment, which permits formation of the product having a lower resistance than conventional conductive film compositions.

Briefly stated, there is provided a low resistance conductive pigment containing indium oxide crystal grains each including a partial amount of Sn. The amount of Sn ranges from about 1 to about 15 mol % relative to the total amount of Sn and In in each of the indium oxide crystal grains. The conductive pigment further includes a specified surface acidity and a specified volume resistivity. The conductive pigment exhibits improved visibility and averages a primary particle size of up to 0.2 μm,. This allows for the manufacture of superior transparent conductive films which can be useful, inter alia, as a transparent electrode in liquid crystal displays and heating elements having transparent surfaces.

In one embodiment, ITO crystals undergo an oxygen extraction treatment, while in another embodiment, surface acidity, is increased by a surface modification treatment. The methods of forming conductive pigments, conductive film forming compositions and conductive resin forming compositions are also disclosed.

According to a feature of the present invention there is provided a conductive pigment which includes: indium oxide crystal grains each including a partial amount of Sn; the partial amount being in a range of from about 1 to about 15 mol % relative to a total amount of Sn and In in each of the indium oxide crystal grains; the conductive pigment further includes a surface acidity in a range from about $8 \times 10^{-7}$ to about $1 \times 10^{-5}$ mol/m²; and a volume resistivity in a range up to about $2 \times 10^0$ $\Omega$.cm.

According to another embodiment of the present invention, there is provided a conductive pigment, including: indium oxide crystal grains each including a partial amount of Sn; the partial amount being in a range of from about 1 to about 15 mol % relative to a total amount of Sn and In in each of the indium oxide crystal grains; the indium oxide crystal grains each further include an oxygen vacancy ranging from about 0.05 to 0.35 mol per mol of the indium oxide crystal grains.

The conductive pigment also includes a color tone of pigment relative to visible ray ranging from about 0.265 to 0.300 in terms of x-value and from 0.290 to 0.315 in terms of y-value in the xy chromaticity scale; and further includes a volume resistivity, as measured by the four-probe method on 50 kg/cm² green compact, ranging from about $8 \times 10^{-1}$ to $1 \times 10^{-2}$ $\Omega$.cm.

According to another embodiment of the present invention, there is provided a conductive pigment, including: indium oxide crystal grains each including a partial amount of Sn; the partial amount being in a range of from about 1 to about 15 mol % relative to a total amount of Sn and In in each of the indium oxide crystal grains.

The conductive pigment includes a surface acidity in a range from about $8 \times 10^{-7}$ to about $1 \times 10^{-5}$ mol/m². The indium oxide crystal grains each further include an oxygen vacancy ranging from about 0.05 to 0.35 mol per mol of the indium oxide crystal grains; a color tone of pigment relative to visible ray ranging from about 0.265 to 0.300 in terms of x-value and from 0.290 to 0.315 in terms of y-value in the xy chromaticity scale; and a volume resistivity, as measured by the four-probe method on 50 kg/cm² green compact, ranging from about $8 \times 10^{-2}$ to $9 \times 10^{-5}$ $\Omega$.cm.

According to another embodiment of the present invention, there is provided a method of manufacturing a conductive pigment, which includes the steps of: immersing indium oxide crystal grains each including Sn in a range of from about 1 to about 15 mol % relative to a total amount of Sn and In in each of the indium oxide crystal grains into at least an organic solvent selected from the group consisting of alcohol, ketone, ester and amine; and heat-treating the indium oxide crystal grains at a temperature of up to 500° C. under one of a reduced pressure and an inert gas atmosphere.

According to another embodiment of the present invention, there is provided a method of manufacturing a conductive pigment, which includes the steps of: heat-treating indium oxide crystal grains at a temperature of up to 500° C. in an inert gas atmosphere containing at least one selected from the group consisting of hydrogen, ammonia and carbon monoxide in an amount ranging from about 0.5 to 20 vol %.

According to another embodiment of the present invention, there is provided a method of manufacturing a conductive pigment, which includes the steps of: heat-treating at least one of an indium oxide crystal grains and precursor hydroxide thereof, both including Sn, in a range of from about 1 to about 15 mol % relative to a total amount of Sn and In at a temperature ranging from about 300° to about 1,150° C. in at least one of a reduced pressure atmosphere and an inert gas atmosphere.

According to another embodiment of the present invention, there is provided a method of manufacturing a conductive pigment, which includes the steps of: heat-treating at least one of an indium oxide crystal grains and precursor hydroxide thereof, both including Sn, in a range of from about 1 to about 15 mol % relative to a total amount of Sn and In at a temperature ranging from about 300° to about 1,150° C. in at least one of a reduced pressure atmosphere and an inert gas atmosphere; immersing resultory material into at least one organic solvent selected from the group consisting of alcohol, ketone, ester and amine; and heat-treating the immersion-treated material at a temperature of up to 500° C. in at least one of a reduced pressure atmosphere and an inert gas atmosphere.

According to another embodiment of the present invention, there is provided a method of manufacturing a conductive pigment, which includes the steps of: heat-treating at least one of an indium oxide crystal grains and precursor hydroxides thereof, both including Sn, in a range of from about 1 to about 15 mol % relative to a total amount of Sn and In at a temperature ranging from about 300° to about 1,150° C. in at least one of a reduced pressure atmosphere and an inert gas atmosphere; and heat-treating resultory material at a temperature of up to 500° C. in an inert gas atmosphere containing at least one selected from the group consisting of $H_2$, $NH_3$ and CO in an amount ranging from about 0.5 to 20 vol. %.

According to another embodiment of the present invention, there is provided a method of manufacturing a conductive pigment, which includes the steps of: heat-treating at least one of an indium oxide crystal grains and precursor hydroxides thereof, both including Sn, in a range of from about 1 to about 15 mol % relative to a total amount of Sn and In at a temperature ranging from about 300° to about 1,150° C. in an inert gas atmosphere containing at least one selected from the group consisting of $H_2$, $NH_3$ and CO in an amount ranging from about 0.5 to 20 vol. %.

According to another feature of the present invention, there is provided a conductive film forming composition which includes a binder and a conductive pigment selected from at least one of the aforementioned embodiments.

According to another feature of the present invention, there is provided a conductive resin forming composition which includes a resin and a conductive pigment selected from the group consisting of at least one of the aforementioned embodiments.

The above, and other objects, features and advantages of the present invention will become apparent from the following description.

DETAILED DESCRIPTION OF THE PREFERRED EMBODIMENT

To achieve the above-mentioned objects, the present inventors have discovered that by acidifying the surface of an ITO pigment leads to higher conductivity. This modification, in turn, results in a volume resistivity, as measured as mentioned above, of under $2 \times 10^0$ $\Omega$.cm.

Additionally, by increasing the oxygen vacancy of an ITO pigment also leads to an improved conductivity. This increases the volume resistivity to up to $8 \times 10^{-1}$ $\Omega$.cm, and at the same time, changes the color of the pigment from conventional yellow to one of blue and grey-blue.

The inventors have also discovered that if the pigment surface is acidified and the oxygen vacancy is increased, the pigment has low resistance ranging from about $8 \times 10^{-2}$ to $9 \times 10^{-5}$ $\Omega$.cm and exhibits a blue tint.

In summary, the present invention can be summarized as follows:

(1) A conductive pigment containing ITO crystal grains, has an Sn content, relative to the total amount of In+Sn, ranging from about 1 to 15 mol %, a surface acidity within a range of from $8 \times 10^{-7}$ to $1 \times 10^{-5}$ mol/cm$^2$, and a volume resistivity of under $2 \times 10^0$, and more preferably at least $2 \times 10^{-2}$ $\Omega$.cm.

The method of manufacturing the above mentioned conductive pigment includes immersing the ITO crystal grains having an Sn content, relative to the total amount of In+Sn, within a range of from 1 to 15 mol % into an organic solvent. The organic solvent is at least one solvent selected from the group consisting of alcohol, ketone, ester and amine. This immersion step is followed by heat-treating the immersion treated material at a temperature of up to 500° C. in one of a reduced pressure and an inert gas atmosphere.

Alternatively, the ITO crystal grains having an Sn content, relative to the total amount of In+Sn, within a range of from 1 to 15 mol %, are heat treated at a temperature of up to 500° C. in an inert gas atmosphere containing at least one selected from a group consisting of hydrogen, ammonia and carbon monoxide in an amount within a range of from 0.5 to 20 vol. %.

(2) A conductive pigment comprising ITO crystal grains, which has an Sn content, relative to the total amount of In+Sn, within a range of from 1 to 15 mol %, an oxygen vacancy ranging from about 0.05 to 0.35 mole per mole of ITO crystal, a color tone of the pigment relative to the visible ray within a range of from 0.265 to 0.300 in terms of x-value and from 0.290 to 0.315 in terms of y-value in the xy chromaticity scale, and a volume resistivity within a range of from $8 \times 10^{-1}$ to $1 \times 10^{-2}$ $\Omega$.cm.

The method of manufacturing the conductive pigment described in (2) above can be manufactured by heat-treating ITO crystal grains or a precursor hydroxide thereof, having an Sn content, relative to the total content of In+Sn, within a range of from 1 to 15 mol %, at a temperature within a range of from 300° to 1,150° C. in one of a reduced pressure and an inert gas atmosphere.

(3) A conductive pigment comprising ITO crystal grains, which has an Sn content, relative to the total amount of In+Sn, within a range of from 1 to 15 mol %, a surface acidity within a range of from $8 \times 10^{-7}$ to $1 \times 10^{-5}$ mol/m$^2$, an oxygen vacancy within a range of from 0.05 to 0.35 mol per mol of ITO crystal, a color tone of pigment relative to visible ray within a range of from 0.265 to 0.300 in terms of x-value and from 0.290 to 0.315 in terms of y-value in the xy chromaticity scale, and a volume resistivity within a range of from $8 \times 10^{-2}$ to $9 \times 10^{-5}$ $\Omega$.cm.

The above-mentioned conductive pigment described in (3) above can be manufactured by at least one of [A] and [B], which are described hereinafter. [A] includes heat-treating one of an ITO crystal grains and a precursor hydroxide thereof having an Sn content, relative to the total amount of In+Sn, ranging from about 1 to 15 mol %, at a temperature ranging from about 300° to 1,150° C. in one of a reduced pressure atmosphere and an inert gas atmosphere. This is followed by either (1) immersing the resultory material in at least one of an organic solvent selected from the group consisting of alcohol, ketone, ester and amine, and then, heat-treating the same at a temperature of up to 500° C. in at least one of a reduced pressure and an inert gas atmosphere; or (2) heat-treating the resultory material at a temperature of up to 500° C. in an inert gas atmosphere containing at least one selected from the group consisting of hydrogen, ammonia and carbon monoxide in an amount within a range of from 0.5 to 20 vol. %; [B] includes heat-treating at least one of an ITO crystal grain and a precursor hydroxide thereof having an Sn content, relative to the total amount of In+Sn, ranging from about 1 to 15 mol %, at a temperature within a range of from 300° to 1,150° C. in an inert gas atmosphere containing at least one selected from the group consisting of hydrogen, ammonia and carbon monoxide in an amount within a range of from 0.5 to 20 vol. %.

In the present invention, the volume resistivity of ITO pigment is measured by the four-probe method in the form of a green compact test prepared under a pressure of 50 kg/cm$^2$.

The surface acidity value is determined by the titration method described hereinafter.

The oxygen vacancy value is determined by a measuring method described hereinafter.

The present invention also provides a conductive film composition which includes at least a binder and at least one conductive pigment selected from the group consisting of 1, 2 and 3, as described above. The present invention also aims at providing a conductive resin composition containing at least one conductive pigment consisting of 1, 2 and 3 as described above.

A detailed description of the examples of the conductive pigment of the present invention and method of manufacturing same follows. The contents are expressed in terms of percents by weight (wt %) except in specified cases.

ITO is characterized by a high conductivity. This is because the trivalent In (Indium) site of the $In_2O_3$ crystal is substituted with a tetravalent Sn (Tin). The Sn serves as an n-type donor and acts as a dopant. The donor effect exhibited by the oxygen vacancy point, caused by the lattice defect, increases the electron density of the multi-carriers in the crystal grains (bulk).

Conductivity resulting from Sn, an n-type donor, is apparent when the Sn content relative to the total amount of In+Sn ranges from about 1 to 15 mol %. When the amount of Sn falls outside this range, the volume resistivity of ITO pigment becomes higher.

Thus, the Sn content relative to the total amount of Sn and In, in the ITO pigment of the present invention should be from about 1 to about 15 mol %. It is preferred that the Sn content be from about 2 to about 10 mol %.

The ITO pigment of the present invention is produced by treating a prior art manufactured pigment. In the manufacture this ITO pigment, sources of at least one of $Sn^{4+}$, $Sn^{2+}$ and In+ ions used for the preparation of mixed aqueous solution containing ions of In and Sn may be any water-soluble compounds giving an acidic solution. It is preferable that the sources of at least one of $Sn^{4+}$, $Sn^{2+}$ and In+ ions include at least one of a hydrochloride, nitrates and mixtures thereof.

The Sn content relative to the total amount of In+Sn should be adjusted to be in a range of from about 1 to about 15 mol %. In contrast, there is no particular limitation for the aqueous alkaline solution. The aqueous alkaline solution can include one of an alkaline metal compounds selected from the group consisting of NaOH, KOH, $Na_2CO_3$, $K_2CO_3$, $NaHCO_3$ and $KHCO_3$, and ammonium compounds such as $NH_4OH$, $(NH_4)_2CO_3$ and $NH_4HCO_3$.

However, it is desirable to use an ammonium compound since an alkaline metal is capable of causing a substantial decrease in the conductivity of the ITO pigment, if it remains in the ITO pigment.

When the above-mentioned mixed aqueous solution reacts with an aqueous alkaline solution, In and Sn ions co-precipitate as hydroxides. More particularly, tin hydroxide/indium hydroxide, which are precursor hydroxides of ITO pigment, co-precipitate.

The reaction temperature may range from room temperature to about 90° C. The reaction time of 30 to 60 minutes suffices in general, depending upon the temperature.

An ITO pigment is made available by filtering the tin hydroxide/indium hydroxide co-precipitate, followed by sufficiently washing the same as required. The hydroxides are then converted into oxides through dehydration, which simultaneously causes crystallization.

The calcining temperature should preferably be from about 300° to about 1,150° C. A low calcining temperature results in a pigment having a small primary particle size (hereinafter simply referred to as "particle size") corresponding to a large specific surface area. In contrast, sufficient crystallization does not take place at a temperature lower than 300° C. While a higher calcining temperature causes grain growth, leading to a larger particle size of the pigment, a temperature higher than 1,150° C. results in excessive grain growth. This excessive grain growth causes coarsening of the average particle size to over 0.6 μm. This feature makes the product unsuitable for use as an ITO pigment.

A calcining time should be one that is effective for complete dehydration and crystallization. This time may vary, depending upon the calcining temperature. After calcining, aggregating particles may be broken by crushing as required.

In a preferred embodiment, the average primary particle size of the ITO pigment should be up to 0.2 μm. This feature imparts transparency. More preferably, the average primary particle size should be from about 0.01 to about 0.1 μm.

In order to obtain such particles, the calcining temperature should generally be from about 300° C. to about 1,050° C. More preferably, the calcining temperature should be from about 300° to about 900° C.

ITO pigments manufactured by a conventional method exhibit a volume resistivity which is higher than $2 \times 10^0$ Ω.cm. It has been shown that even repeated washings to eliminate impurities, do not provide a pigment with a low resistance. Thus it is impossible to achieve a volume resistivity in the order of $10^{-3}$ to $10^{-4}$ Ω.cm, as is available in the vapor deposition method.

However, the present invention aims at solving the aforementioned problem relating to prior art ITO pigments. According to the present invention, it is now possible to further reduce volume resistivity by increasing at least one of a surface acidity and oxygen vacancy of the ITO pigment.

SURFACE ACIDITY OF ITO PIGMENT

The surface acidity was determined by contacting an ITO pigment of a predetermined weight with 0.01N methylisobutylketone solution containing tetrabutylammonium hydrides. This was followed by back-titrating the supernatant liquid with a 0.01N methylisobutylketone solution of perchloric acid.

The surface basicity was determined by contacting an ITO pigment of a predetermined weight with a 0.01N methylisobutylketone solution of perchloric acid, followed by back-titrating the supernatant liquid with a 0.01N methylisobutylketone solution of tetrabutylammonium hydrides.

The results displayed are the acidity and basicity levels for the specific surface area of the ITO pigment as determined by the BET method.

These results suggest that the conventional ITO pigment has a surface basicity within a range of from $8 \times 10^{-7}$ to $10^{-5}$ mol/m² and a very low surface acidity which is about a tenth of the basicity. This suggests that the conventional pigment has high basicity.

It has been observed that a higher volume resistivity leads to a higher surface basicity and a lower volume resistivity corresponds to a lower surface basicity. Similarly, a higher surface acidity results in a lower volume resistivity. This is attributable to the fact that a lower basicity and hence a higher acidity of the ITO pigment surface correspond to an increased carrier electron density.

In order to reduce resistance and improve conductivity of an ITO pigment, it is preferable to modify a high-basicity surface into a high-acidity surface. In view of this finding, the present inventors have devised a method of treating an ITO pigment which modifies a highly-basic surface into a highly-acidic surface. The surface modification method allows one to modify a basic surface into an acidic surface. The surface modification method includes immersing the ITO pigment in an organic solvent selected from the group consisting of alcohol, ketone, ester and amine, followed by a heat-treatment step. The heat treatment step includes heat-treating the immersed-treated ITO pigment at a temperature of up to 500° C. in one of a vacuum and an inert gas atmosphere.

The organic solvents used in the surface modification method can include at least one alcohol selected from the group consisting of methanol, ethanol, propanol, isopropanol, 1-butanol, 2-butanol, isobutanol, tertbutyl alcohol, hexanol, cyclohexanol, ethylene glycol, butoxyethanol, and 2-(2-butoxy)ethanol; at least one ketone selected from the group consisting of acetone, methylethylketone, methylisobutylketone, 4-hydroxy-4-methyl-2-pentanone, cyclohexanone, isoholon, and diacetone alcohol; and at least one ester selected from the group consisting of ethyl acetate, butyl acetate, and butylcarbitol acetate; and at least one amine selected from the group consisting of dimethylamine, tributylamine, ethanol amine, dimethylformamide, hydroxytetra-n-butyl-ammonium, trimethylamine, dimethyl-sec-butylamine, cyclohexylamine, and ethylenediamine.

At least one of a solvent and a mixed solvent selected from the group consisting of the abovementioned organic solvents can be used. At least one of an organic solvent besides those enumerated above can also be used, such as, for example, hexane.

It is sufficient to immerse the ITO pigment into an organic solvent at room temperature. Alternatively, the solvent may be heated, as long as it does not excessively evaporate. There is no particular limit on the immersion time. A very short immersion time of from several seconds to ten minutes is usually sufficient. Immersion may be continued for 30 minutes or more.

The immersed ITO pigment is then heat-treated at a temperature of up to 500° C. in one of a reduced pressure and an inert gas atmosphere such as, for example, one of a nitrogen, argon and helium. This is a drying step. The heat-treatment temperature should preferably be within a range of from 50° to 400° C. The heat-treatment period must ensure that the ITO pigment is dry. A period of from five minutes to four hours is preferable, but is dependent on the heat-treatment temperature.

If the heat-treatment temperature is higher than 300° C., a period of up to an hour is sufficient to ensure drying of the ITO pigment. On the other hand, when the heat-treatment is carried out at a reduced pressure, the vacuum atmosphere should preferably be up to $10^{-1}$ torr.

In another surface modification method, an ITO pigment is subjected to a simple heat treatment step, without the additional step of immersing the ITO pigment in an organic solvent. The heat treatment is carried out in an inert gas atmosphere at a temperature of up to 500° C. The inert gas atmosphere contains at least one of a hydrogen ($H_2$), ammonia ($NH_3$), and carbon monoxide (CO) in an amount ranging from about 0.5 to 20 vol %. Similar to the previously mentioned surface modification method employing an immersion step, the above step also provides an increase in the surface acidity.

The preferred concentration of at least one of a (total concentration in the case of two or more gases) of $H_2$, $NH_3$ and CO contained in the inert gas (e.g., nitrogen, argon and helium) is 1 to 10 vol %. When the concentration of at least one of $H_2$, $NH_3$ and CO contained in the inert gas which includes one of a nitrogen, argon and helium, for example, falls below 0.5 vol %, the degree of surface modification is deemed to be insufficient. On the other hand, when the concentration of at least one of a $H_2$, $NH_3$ and CO exceeds 20 vol %, reduction to an insulating InO and in turn, to a metallic In is easier.

The heat treatment temperature and the heat-treating time should preferably be the same as described above.

Irrespective of which of the above methods is adopted, the ITO pigment after treatment exhibits a considerable decrease in surface basicity and a simultaneous increase in the acidic site. The increase in the surface acidity is typically represented by a surface acidity ranging from about $8 \times 10^{-7}$ to about $1 \times 10^{-5}$ mol/m$^2$.

The surface acidity should preferably be from about $1 \times 10^{-6}$ to $5 \times 10^{-6}$ mol/m$^2$. As a result of the increased surface acidity, the thus-obtained ITO pigment exhibits improved conductivity, with a volume resistivity of under $2 \times 10^{0}$ and/or at least $2 \times 10^{-2}$ $\Omega$.cm.

In other words, resistance can be reduced by at least one to two digits as compared with a non-treated ITO pigment.

OXYGEN VACANCY OF ITO PIGMENT

As described above, the oxygen vacancy site that is present within an ITO crystal grain, exerts a donor effect which increases the carrier electron density. This feature, in turn, substantially improves conductivity.

The present inventors have discovered that heat treatment of an ITO pigment in one of an inert gas atmosphere and a reduced pressure results in an extraction of oxygen from the ITO crystal grains. This provides an increase in the number of oxygen vacancy sites which in turn, causes a substantial decrease in volume resistivity of the ITO pigment.

The inventors have discovered that an increase in the number of oxygen vacancy sites (herein referred to as "oxygen vacancy"), which is available after by heat treatment, leads to a simultaneous increase in the carrier electron density. According to this invention, when oxygen vacancy ranges from about 0.05 to 0.35 mol per mol of an ITO crystal, the carrier electron density reaches its peak, reducing resistance, while simultaneously changing conventional yellow ITO pigments to blue and/or grey blue pigments.

In the present invention, the term oxygen vacancy means the mol quantity of oxygen atoms extracted during treatment, i.e., the amount of oxygen vacancy sites introduced through heat treatment of an ITO pigment effective to extract oxygen, as described above.

The value of oxygen vacancy can therefore be relatively determined by comparing this amount with the amount of oxygen vacancy sites in another ITO pigment not subjected to a oxygen extracting treatment. The oxygen vacancy is thus relatively determined because water and other oxygen containing compounds are easily adsorbed onto the surface of the fine ITO pigment.

Accurate quantitative determination of the amount of oxygen in the IT pigment is difficult.

The method of measuring oxygen vacancy is as follows. First, a sample of an ITO pigment subjected to an oxygen extracting treatment is dissolved in solid-solution form with an alkali. This is achieved by the alkali fusion method (fusion with sodium carbonate when determining In, and with sodium peroxide when determining Sn). The resultory salt is then cooled and dissolved in distilled water to form a solution. Respective In and Sn levels are determined through titration or high frequency plasma emission spectrochemical analysis (ICP) using the solution, impurities are also determined as well by a known method.

The amount of oxygen is determined by a gas analysis method (comprising melting and reducing the sample by the fusion method to reduce O in the sample into CO, and determining the O by an infrared absorption method).

The composition of the ITO pigment ($Sn_nIn_{2-n}O_m$) is determined from the resultant data. In a similar manner, the composition ($Sn_nIn_{2-n}O_{m'}$) of other ITO pigments manufactured by the same method without oxygen extracting treatment are determined. By subtracting the oxygen molar quantity (m-value) of the treated ITO pigment from the oxygen molar quantity (m'-value) of the non-treated IT pigment, the amount of oxygen vacancy sites occurring in the oxygen extracting treatment, (the oxygen vacancy) is determined.

This amount calculable as [m'−m] means the number of moles of oxygen vacancy sites having occurred (number of extracted oxygen mols) per mol of ITO crystal. Since the Sn content relative to In and Sn ranges from about 1 to 15 mol %, the n-value in the above formula of composition would be within a range of from 0.02 to 0.30.

According to the present invention, the oxygen vacancy thus determined should preferably be from about 0.05 to 0.35 mol, and more preferably, from about 0.10 to about 0.30 mol per mol of the ITO crystal. By doing this, the volume resistivity of the ITO pigment is from about $8 \times 10^{-1}$ to $1 \times 10^{-2}$ Ω.cm. This feature, in turn, permits reduced resistance of at least one or two digits.

The color tone of the ITO pigment subjected to an oxygen extracting treatment changes from conventional yellowish to one of blue and grey-blue. The color tone of the bluish pigment relative to visible rays can be measured by means of a color computer (manufactured, for example, by Suga Mfg. Co., Ltd.). The measurements reveal that the x-value is within a range of from 0.265 to 0.300, and the y-value, from about 0.290 to 0.315 in the xy chromaticity scale.

On the other hand, conventional yellowish non-treated ITO pigment have a x-value ranging from about 0.265 to 0.348, and the y-value, from 0.316 to 0.475.

It is generally known that human visibility reacts significantly to rays of a wavelength of about 555 nm from among the visible ray wavelengths of from 380 to 780 nm. A conductive film with a higher visibility can be formed by the discussed bluish ITO pigment than by the conventional yellowish ITO pigment.

An ITO pigment manufactured by one of the methods described above and a precursor hydroxide method (tin hydroxide/indium hydroxide co-precipitate) may be used as the ITO starting material for oxygen extraction treatment.

Oxygen extraction may be accomplished by heat-treating one of an ITO pigment and a precursor hydroxide at a temperature of from about 300° to 1,150° C. in one of a reduced pressure and an inert gas atmosphere. Application of heat treatment in one of a reduced pressure and an inert gas atmosphere, without immersing the surface into an organic solvent such as alcohol, ensures sufficient oxygen extraction.

Any one of a nitrogen, argon and helium and mixed gases thereof may be used as the inert gas. The pressure when heat-treating under a reduced pressure should preferably be up to $10^{-1}$ torr. When the heat treatment temperature is on a high side, albeit within the defined range, grain growth takes place during heat treatment, as in calcining upon manufacturing an ITO pigment.

An appropriate heat treatment temperature should therefore be selected in response to the particle size of the ITO pigment. For example, when the particle size of an ITO pigment is to be up to 0.2 μm, the heat treating temperature should preferably be up to 1,050° C., and more preferably from about 300° to about 900° C.

An appropriate heat treating time is selected to ensure that a prescribed amount of oxygen vacancy is produced during heat treatment, but a time longer than that in the above mentioned heat treatment for surface modification is required in general. Usually, a predetermined time of from 1 to about 10 hours is desirable in cases where the material is an ITO pigment, and from 0.5 to 6 hours, when the material is a hydroxide.

A precursor hydroxide, having a large specific surface area, causes rapid oxygen extraction. In all cases, at a temperature of up to 500° C., the predetermined heat treatment time of at least 2 hours is desirable.

When the material is a precursor hydroxide (co-precipitate hydroxide), this heat treatment is accompanied by a simultaneous dehydration and crystallization. An ITO pigment having an oxygen vacancy within the above mentioned range is obtained. In this case, the oxygen vacancy is determined through comparison with an ITO pigment obtained by calcining the co-precipitate hydroxides in the open air under the same conditions.

COMBINATION OF SURFACE MODIFICATION AND OXYGEN EXTRACTION

In another preferred embodiment of the present invention, above-mentioned surface modification and oxygen extraction steps are carried out simultaneously. This combination provides a bluish ITO pigment having a resistance which is lowered by five or more digits compared to conventional ITO pigments. The low resistance is evinced by surface acidity readings which are from about $8 \times 10^{-7}$ to $1 \times 10^{-5}$ mol/m$^2$, an oxygen vacancy ranging from about 0.05 to about 0.35 mol per mol of ITO crystal, an x-value of from about 0.265 to 0.300 and a y-value, of from about 0.290 to 0.315 in the xy chromaticity scale. The ITO pigment exhibits a bluish tint relative to visible rays, and a volume resistivity of from about $8 \times 10^{-2}$ to $9 \times 10^{-5}$ Ω.cm.

This ITO pigment exhibits conductivity similar to prior art sputtering films while it has superior visibility compared to prior art low visibility sputtering films which exhibit prominent yellow tones.

Such superior ITO pigments can be manufactured, with the ITO pigment prepared by the above-mentioned conventional method or its precursor hydroxide (In/Sn co-precipitate hydroxide) as the starting material. The method of manufacturing such superior ITO pigments includes, subjecting the pigment to an oxygen extracting treatment step similar to the one discussed (i.e., heat treatment at a temperature within a range of from 300° to 1,150° C. in one of a reduced pressure and an inert gas atmosphere), followed by conducting the surface modification [i.e., including at least one of (a) immersing same in at least an organic solvent selected from the group consisting of alcohol, ketone, ester and amine, and then heat-treating same at a temperature of up to 500° C. in one of a reduced pressure and an inert gas atmosphere; and (b) heat-treating same at a temperature of up to 500° C. in an inert gas atmosphere containing at least one of $H_2$, NH3, and CO]. Preferred treatment conditions in this case may be as described above.

Another method of simultaneously performing both the oxygen extraction and surface modification comprises heat-treating one of an ITO pigment and a precursor hydroxide at a temperature ranging from about 300° to 1,150° C. in a reducing inert gas atmosphere containing at least one selected from the group consisting of $H_2$, $NH_3$ and CO, present in a concentration of from about 0.5 to about 20 vol. %.

This method makes it possible to manufacture an ITO pigment directly from the raw materials by means of a heat treatment step. The ITO pigment is characterized by a surface acidity ranging from about $8 \times 10^{-7}$ to $1 \times 10^{-5}$ mol/$m^2$, an oxygen vacancy of from about 0.05 to about 0.35 mol per mol of the ITO crystal, a color tone relative to visible rays, having a an x-value within a range of from 0.265 to 0.300 and a y-value, from 0.290 to 0.315 in the xy chromaticity scale, and a volume resistivity of from $8 \times 10^{-2}$ to about $9 \times 10^{-5}$ n cm.

With the total concentration of one of $H_2$, $NH_3$, and CO (the total concentration in the case of two or more of them) contained in the inert gas including at least one of nitrogen, argon, helium and similar gases falls below 0.5 vol. %, surface modification is insufficient.

The preferred concentration should be from about 1 to 10 vol %. An appropriate heat treatment temperature should be selected in response to the particle size of the target ITO pigment. The preferred ranges of heat treatment temperature and heat treatment time are the same as those described above for the heat treatment required for oxygen extraction.

The low-resistance ITO pigment of the present invention can be used as a conductive film forming composition. This is achieved by mixing the ITO pigment with a binder and a solvent, as required.

The resultory composition may be one of a paste, paint and ink. The amount of blended ITO pigment should preferably be from about 50 to 90 wt. % relative to the aggregate sum of binder (solid) and ITO pigment. Kinds and amounts of binder, solvent and other arbitrary additives may be the same as conventional ones.

The composition can be applied or printed onto a substrate and heated or dried to provide a conductive film having lower surface resistance compared to prior art ITO pigments. Particularly when the ITO pigment has been subjected to both surface modification and oxygen extraction, there is available a conductive film having a low resistance comparable with a sputtering film. If the ITO pigment has a particle size of up to 0.2 μm and the binder is transparent, a transparent conductive film is formed.

When the ITO pigment has an oxygen vacancy within the above-mentioned range, the color tone of the transparent conductive film has a blue tint and exhibits improved visibility. This transparent conductive film is useful as a transparent electrode, transparent sheet-shaped heating element, electromagnetic wave shielding material, and antistatic film.

By kneading the low-resistance ITO pigment of the present invention with a resin, a conductive resin forming composition can be formed. The amount of the ITO pigment that is blended with the resin should preferably be from about 50 to 85 wt. % relative to the aggregate sum of resin (solid) and ITO pigment. There is no particular limitation on the kind of resin that can be used. Any one of a thermosetting and thermoplastic resin can be used.

A special resin such as one of a silicone resin and a fluororesin may also be used. The conductive resin obtained from this composition is useful for use in electronic circuit, electrode, electromagnetic wave shielding material and antistatic material.

A detailed description of the examples of the ITO pigments of the present invention follows. The contents are expressed in terms of percents by weight (wt %), provided however that, the Sn content in ITO pigment is represented by mol % relative to the total content of In and Sn. The examples shown are only illustrative and do not constitute any limitation on the present invention.

In the examples, the surface acidity, surface basicity and oxygen vacancy were measured by the methods mentioned above. The volume resistivity was measured by the four-probe method on a green compact under 50 kg/$cm^2$. The primary particle size of the pigment is the average particle size as measured by observing the pigment with a transmission type electron microscope. The specific surface area was measured by the BET method ($N_2$).

The pigment was analyzed by means of an aqueous solution prepared from the sample by the above-mentioned alkali fusion method for a chloride element, in accordance with the high-frequency plasma emission spectrochemical analysis (ICP) method for a metal element, and in accordance with the silver chloride calorimetric method. The oxygen content was analyzed by the above-mentioned gas analysis method.

EXAMPLE 1

900 ml of an aqueous solution of $InCl_3$ (containing 300 g metallic In) was mixed with 26.5 g of an aqueous solution of 55% $SnCl_4$. The resultory mixed solution was reacted with a 6 liter aqueous alkaline solution containing 1,800 g $NH_4HCO_3$ at a liquid temperature of 50° C. for 30 minutes. Decantation was repeatedly applied to the precipitate by means of ion-exchange water.

In/Sn co-precipitate hydroxides were filtered when the electric conductivity of the supernatant liquid measured more than 5,000 Ω.cm. They were dried overnight at 110° C., and calcined in open air at 600° C. for three hours. The resultory product was crushed to dissociate aggregates, and 369.5 g of a yellow ITO pigment having an Sn content of 2.09 mol % was obtained.

This pigment (ITO available through calcination in the open air—called "non-treated ITO pigment") had a specific surface area of 37.5 $m^2$/g, a primary particle size of from 0.015 to 0.027 μm, a volume resistivity of $2.7 \times 10^{-2}$ Ω.cm, a surface basicity of $7.3 \times 10^{-6}$ mol/$m^2$, and a surface acidity of $6.8 \times 10^{-7}$ mol/$m^2$.

50 g of the non-treated ITO pigment was immersed in 20 g of ethanol at room temperature for one minute, dried in a reduced pressure atmosphere ($10^{-3}$ torr) at 100° C. for 30 minutes. This was followed by cooling the resultory material at room temperature. The thus-obtained pigment (after surface modification treatment) exhibited a surface acidity of $2.1 \times 10^{-6}$ mol/$m^2$, with minimal surface basic sites, and a volume resistivity of $5.8 \times 10^{-2}$ Ω.cm, i.e., the resistance was reduced by about four digits by means of the surface modification.

Application of the surface modification treatment caused no change in the specific surface area and the primary particle size.

EXAMPLE 2

50 g of the non-treated ITO pigment obtained in Example 1 were immersed in 20 g of methylethylketone at room temperature for 1 minute. This was followed by drying the dissolved pigments in a reduced pressure atmosphere ($10^{-1}$ tour) at a temperature of 300° C. for 10 minutes, and cooling the dried material the room temperature. After this treatment, the pigment exhibited a surface acidity of $2.3 \times 10^{-6}$ mol/m$^2$, with almost all basic sites having disappeared, volume resistivity of about $4.8 \times 10^{-2}$ Ω.cm, a specific surface area of 31 m$^2$/g and a primary particle size of from about 0.018 to 0.032 μm.

EXAMPLE 3

50 grams of the non-treated ITO pigment obtained in Example 1 was immersed in 20 grams of ethyl acetate at the room temperature for 30 minutes. After heat treatment for ten minutes at 300° C. in an $N_2$ atmosphere in a silica tube, and then cooled to room temperature. After this surface modification treatment, the pigment exhibited a surface acidity of $2.2 \times 10^{-6}$ mol/m$^2$, with its surface basic sites having almost disappeared, a volume resistivity of $5.0 \times 10^{-2}$ Ω.cm, a specific surface area of 30.2 m$^2$/g, and a primary particle size ranging from 0.017 to 0.030 μm.

EXAMPLE 4

50 grams of the non-treated ITO pigment obtained in the Example 1 was immersed in a solution containing 2 grams tributylamine/20 grams hexane at room temperature for 5 minutes. After heat treatment for ten minutes at 150° C. in $N_2$ atmosphere in a silica tube, the dried material was cooled to room temperature.

The resultory pigment exhibited a surface acidity of $2.0 \times 10^{-6}$ mol/m$^2$, with all the basic sites having almost disappeared, and a volume resistivity of $4.4 \times 10^{-2}$ Ω.cm. The surface modification caused no change in the specific surface area and the primary particle size of the pigment.

EXAMPLE 5

50 grams of the non-treated ITO pigment obtained in the Example 1 was immersed in 20 grams of ethanol at the room temperature for 5 minutes. After drying in a reduced pressure ($10^{-4}$ torr) for 60 minutes at 50° C., the dried resultant material was cooled to room temperature. After the surface modification treatment, the resultory pigment exhibited a surface acidity of $2.5 \times 10^{-6}$ mol/m$^2$, with all the basic sites having almost disappeared, and a volume resistivity of $5.1 \times 10^{-2}$ Ω.cm. The surface modification caused no change in the specific surface area and the primary particle size of the pigment.

EXAMPLE 6

600 ml of an aqueous $InCl_3$ solution (containing 200 g metallic In) was mixed with 95 g of an aqueous 55% $SnCl_4$ solution. The mixed aqueous solutions were then reacted with a 6 liter alkaline solution containing 1,450 g $NH_4HCO_3$ at a liquid temperature of 70° C. for 1 hour. Precipitation by means of ion-exchange water was achieved by repeated decantation. When the electric conductivity of the supernatant liquid exceeded 5,0000 Ω.cm., the co-precipitate hydroxides were filtered, and dried overnight at 110° C. After drying, the co-precipitate was calcined in open air at 1,150° C. for 3 hours, and crushed to provide 268.5 g of an ITO pigment with an Sn content of 10.3 mol %.

This yellowish non-treated ITO pigment exhibited a specific surface area of 3.1 m$^2$/g, a primary particle size ranging from 0.17 to 0.42 μm, a volume resistivity of $2.3 \times 10^0$ Ω.cm, a surface basicity of $1.2 \times 10^{-6}$ mol/m$^2$, and a surface acidity of $1.8 \times 10^{-7}$ mol/m$^2$.

This non-treated ITO pigment was then surface modified. Surface modification treatment included heat-treating 50 grams of the non-treated ITO pigment at 300° C. for 30 minutes through a mixed gas flow comprising 950 ml/min $N_2$ and 50 ml/min CO in a silica tube, followed by cooling the heat treated material to room temperature. After the surface modification treatment step, the resultory pigment was characterized as having a surface acidity of $1.9 \times 10^{-5}$ mol/m$^2$, with almost none of its surface basic sites, a volume resistivity of $6.8 \times 10^{-2}$ Ω.cm. A reduction in resistance of almost two digits was achieved by means of the surface modification treatment step. The treatment caused no change in the specific surface area and the primary particle size.

EXAMPLE 7

50 grams of the non-treated ITO pigment obtained in the Example 6 was heat-treated at 50° C. for 60 minutes (1 hour) through a mixed gas flow containing 980 ml/min $N_2$ and 20 ml/min $H_2$ in a silica tube. The sample was then cooled to room temperature. Close examination of the resultory pigment, revealed that the thus-obtained pigment had a surface acidity of $2.0 \times 10^{-6}$ mol/m$^2$, with almost none of the surface basic sites visible, and a volume resistivity of $5.6 \times 10^{-2}$ Ω.cm. The surface modification had no impact on the specific surface area and the primary particle size of the pigment.

EXAMPLE 8

50 grams of the non-treated ITO pigment obtained in Example 6 was heat-treated at 50° C. for 60 minutes through a mixed gas flow comprising 980 ml/min $N_2$ and 20 ml/min $NH_3$ in a silicate tube. The sample was then cooled to room temperature. After the surface modification treatment, the pigment exhibited a surface acidity of about $2.0 \times 10^{-6}$ mol/m$^2$, with almost all of the surface basic sites removed, and a volume resistivity of $6.6 \times 10^{-2}$ Ω.cm. The surface modification had no impact on the specific surface area and the primary particle size of the pigment.

EXAMPLE 9

900 ml of an aqueous $InCl_3$ solution (containing 300 g metallic In) was mixed with 54.4 grams of an aqueous 55% $SnCl_4$ solution. After mixing, the mixed solution was reacted with a 6 liter alkaline solution containing 1,800 g $NH_4HCO_3$ at a liquid temperature of 70° C. for 60 minutes, followed by repeated decantation to the precipitate by means of an ion-exchange water. When the electric conductivity of the supernatant liquid exceeded 5,000 Ω.cm, the co-precipitated hydroxides were filtered, and dried overnight at 110° C. The co-precipitated hydroxides were then calcined in open air at 300° C. for 5 hours. Upon crushing the calcined material, 371 grams of an ITO pigment having an Sn content of 4.2 mol % was obtained.

The resultory yellow tinted non-treated ITO pigment had a specific surface area of 118 m$^2$/g, a primary particle size ranging from 0.01 to 0.02 μm, a volume resistivity of $3.5 \times 10^{-2}$ Ω.cm, a surface basicity of $7.2 \times 10^{-6}$ mol/m$^2$, a surface acidity of $6.2 \times 10^{-6}$ mol/m$^2$.

50 grams of the thus-obtained non-treated ITO pigment was immersed in 20 grams of methanol at the room temperature for five minutes. After drying in a reduced pressure atmosphere ($10^{-3}$ torr) at 150° C. for 60 minutes, the samples were cooled to room temperature. After the surface modification treatment, the resultory pigment exhibited a surface acidity of $9.1 \times 10^{-6}$ mol/m$^2$, with almost all of the surface basic sites removed, and a volume resistivity of $7.8 \times 10^{-1}$ Ω.cm, a surface area of 117 m$^2$/g and a primary particle size ranging from 0.01 to 0.02 μm.

COMPARATIVE EXAMPLE 1

50 grams of the non-treated ITO pigment obtained in the Example 1 was immersed in 20 grams of benzene at the room temperature for 1 minute, and after drying in a vacuum ($10^{-3}$ torr) atmosphere at a temperature of 100° C. for 30 minutes, the dried material was cooled to room temperature.

After this treatment, the pigment exhibited a surface basicity of $7.2 \times 10^{-6}$ mol/m$^2$, a surface acidity of $7.0 \times 10^{-7}$ Mol/m$^2$, and a volume resistivity of $2.5 \times 10^{-2}$ Ω.cm. The immersion in benzene caused no significant change in the surface basicity, surface acidity and volume resistivity.

EXAMPLE 10

A non-treated ITO pigment having an Sn content of 2.09 mol % was prepared in the same manner as in the Example 1 except the calcination temperature was changed from 600° C. to 500° C. This pigment had a specific surface area of 92.5 m$^2$/g, a primary particle size ranging from about 0.007 to 0.014 μm, a volume resistivity of $1.2 \times 10^{-2}$ Ω.cm, and a color tone represented by an x-value of 0.3632 and a y-value of 0.3859 on the xy chromaticity scale relative to visible rays. The pigment was in the form of yellow powder.

50 grams of this non-treated ITO pigment was heat-treated at 500° C. for 4 hours in a N$_2$ atmosphere in a silica tube, and then cooled to room temperature. The powder obtained was grey-blue in color.

For both the non-treated and the heat-treated pigments, results of ICP analysis revealed the presence of only Si, Ca and Na as impurities ranging from about 1 to 50 ppm, respectively. No other metal element was observed. The Cl content was determined by silver chloride calorimetric analysis and was determined to be 26 ppm.

For each of the non-treated and heat treated pigments, the composition formula was determined from amounts of In and Sn as derived by ICP analysis. The amount of O by gas analysis, the weight of sample and the respective amounts of impurities as discussed above, and the oxygen vacancy for the ITO pigments introduced through heat treatment were calculated.

The oxygen vacancy per mol of ITO crystal (hereinafter referred to as the "oxygen vacancy") was determined to be 0.278 mol.

After heat treatment, the resultory pigment had a specific surface area of 85.8 m$^2$/g, a primary particle size ranging from about 0.011 to 0.020 μm, a volume resistivity of $6.0 \times 10^{-2}$ Ω.cm, and a color tone represented by an x-value of 0.2987 and a y-value of 0.3095 on the xy chromaticity scale relative to visible rays.

By means of the above mentioned heat treatment step, a substantial reduction in resistance, of almost four digits, was observed with a simultaneous improvement in color tone.

EXAMPLE 11

50 grams of the non-treated ITO pigment obtained in the Example 10 was heat-treated in a reduced pressure atmosphere of $5 \times 10^{-2}$ torr at 600° C. for 6 hours in a silica tube, and then cooled to room temperature. After the heat treatment, the ITO pigment revealed a blue-green color, an oxygen vacancy of 0.226 mol, a specific surface area of 68.0 m$^2$/g, a primary particle size ranging from about 0.009 to 0.027 μm, a volume resistivity of $8.2 \times 10^{-2}$ Ω.cm, and a color tone relative to visible rays comprising an x-value of 0.2988 and a y-value of 0.3090 on the xy chromaticity scale.

EXAMPLE 12

50 grams of the non-treated ITO pigment obtained in the Example 10 was heat-treated at 300° C. for 6 hours in an N$_2$ atmosphere in a silica tube, and then cooled to room temperature. After the heat treatment, the pigment had a blue-green color, an oxygen vacancy of 0.071 mol, a specific surface area of 67.1 m$^2$/g, a primary particle size ranging from about 0.009 to 0.027 μm, a volume resistivity of $9.8 \times 10^{-2}$ Ω.cm, and a color tone relative to visible rays, comprising an x-value of 0.2980 and a y-value of 0.3055 on the xy chromaticity scale.

EXAMPLE 13

50 grams of the non-treated ITO pigment obtained in the Example 10 was heat-treated at 1,150° C. for 3 hours in an N$_2$ atmosphere in a silica tube, and then cooled to room temperature. After the heat treatment, the pigment had grey-blue color, an oxygen vacancy of 0.321 mol, a specific surface area of 1.4 m$^2$/g, a primary particle size ranging from about 0.36 to 0.58 μm, a volume resistivity of $2.2 \times 10^{-2}$ Ω.cm, and a color tone when compared with visible rays, comprising an x-value of 0.2887 and a y-value of 0.3066 on the xy chromaticity scale.

EXAMPLE 14

283 grams of a non-treated ITO pigment, having an Sn content of 14.24 mol % was prepared in the same manner as in the Example 6, except that 137 grams of the aqueous 55% SnCl$_4$ solution replaced 95 grams of the aqueous 55% SnCl$_4$ solution of example 6.

The resultory pigment exhibited a specific surface area of 4.1 m$^2$/g, a primary particle size ranging from about 0.19 to 0.40 μm, a volume resistivity of $7.5 \times 10^0$ Ω.cm, and a color tone relative to visible rays, comprising an x-value of 0.324 and a y-value of 0.353 on the xy chromaticity scale. The pigment was yellow in color and in powder form.

Then, 50 g of this non-treated ITO pigment was calcined at 500° C. for 5 hours in an N$_2$ atmosphere in a silica tube, and then cooled to room temperature to provide a grey-blue pigment. After heat treatment, the pigment had an oxygen vacancy of 0.190 mol, a specific surface area of 2.6 m$^2$/g, a primary particle size ranging from about 0.30 to 0.36 μm, a volume resistivity of $5.4 \times 10^{-2}$ Ω.cm, and a color tone relative to visible rays, comprising an x-value of 0.2991 and a y-value of 0.3041 on the xy chromaticity scale.

Impurity concentrations of the individual non-treated and heat-treated ITO pigments were observed to be ranging from about 1 to about 50 ppm and consisted of Si, Ca and Na as metal elements, with a Cl content of 8 ppm.

EXAMPLE 15

800 ml's of an aqueous InCl$_3$ solution (containing 300 g metal In), was mixed with 80 g of an aqueous 55% SnCl$_4$ solution. The mixed aqueous solutions were then allowed to react with a 6 liter aqueous alkaline solution containing 1,800 g NH$_4$HCO$_3$ at a liquid temperature of 70° C. for 2 hours, followed by repeatedly decanting the precipitate by using ion-exchange water.

When the electric conductivity of the supernatant liquid reached 5,000 Ω.cm, the precipitate was filtered, and dried overnight at 110° C., to yield 488 grams of an In/Sn co-precipitate hydroxide, which was a precursor hydroxide of the ITO pigment.

Then, 50 grams of this co-precipitate hydroxide (ITO precursor hydroxide) was heat-treated at 700° C. for 4 hours in an $N_2$ atmosphere in a silica tube, and then cooled to room temperature. This, in turn, yielded a grey-blue ITO pigment.

50 grams of the thus-obtained hydroxide was separately calcined in open air at 700° C. for 4 hours, resulting in a yellow ITO pigment. In any of these ITO pigments, metal impurities were limited to Si, Ca and Na ranging from about 1 to 50 ppm, respectively, while no other element was found, and Cl in an amount substantially equal to 20 ppm was also observed.

In all cases, the Sn content in all the pigments was determined to be 6.07 mol %.

The above-mentioned ITO pigment obtained by air calcining hydroxide (hereinafter referred to as "non-treated ITO pigment") exhibited a specific surface area of 34.0 $m^2/g$, a primary particles size ranging from about 0.018 to 0.031 μm, a volume resistivity of $3.0 \times 10^0$ Ω.cm, and a color tone represented by an x-value of 0.340 and a y-value of 0.368 relative to visible rays on the xy chromaticity scale.

The above-mentioned ITO pigment obtained by heat treating hydroxide in an $N_2$ atmosphere, as compared with the non-treated ITO pigment, had an oxygen vacancy of 0.215 mol, a specific surface area of 21 $m^2/g$, a primary particles size ranging from about 0.025 to 0.042 μm, a volume resistivity of $5.4 \times 10^{-2}$ Ω.cm, and a color tone represented by an x-value of 0.2906 and a y-value of 0.3048 relative to visible rays on the xy chromaticity scale.

EXAMPLE 16

50 grams of the grey-blue ITO pigment, having an Sn content of 2.09 mol, which was previously obtained in the Example 10 (by heat-treating at 500° C. for 4 hours in an $N_2$ atmosphere and cooled to room temperature,) was immersed in 20 grams of ethanol for 10 minutes at the room temperature, and after drying in a vacuum atmosphere ($10^{-3}$ torr) at 100° C. for 30 minutes, it was cooled to room temperature.

The ITO pigment after the surface modification treatment exhibited an apparent color tone with no change. Additionally, its oxygen vacancy was determined to be 0.278 mol, which was equal to that of the Example 10, and its specific surface area of 85.8 $m^2/g$ and primary particle size of 0.011 to 0.020 μm was similar to the results obtained in Example 10.

This ITO pigment had a surface acidity of $3.5 \times 10^{-6}$ mol/$m^2$ without any visible surface basic sites. While the non-treated ITO pigment before heat treatment in an $N_2$ atmosphere had a surface basicity of $6.8 \times 10^{-6}$ mol/$m^2$, the ITO pigment of the Example 10 heat treated in an $N_2$ atmosphere exhibited a surface basicity of $6.1 \times 10^{-6}$ mol/$m^2$. Both pigments showed a surface acidity which was about a tenth of the surface basicity.

The ITO pigment after the surface modification treatment had a volume resistivity of $6.8 \times 10^{-3}$ Ω.cm, and a color tone represented by an x-value of 0.2968 and a y-value of 0.3080 relative to visible rays on the xy chromaticity scale. When compared to the volume resistivity ($11.2 \times 10^{-2}$ Ω.cm) of the non-treated ITO pigment (calcined at 500° C. in the open air), a combination of surface modification treatment with the generation of oxygen vacancies (by being heat-treated in an $N_2$) is capable of reducing the resistance by about 5 digits. A reduction by about 1 digit is possible when heat treatment is done in an $N_2$ atmosphere alone or when the surface modification treatment is carried out alone.

EXAMPLE 17

50 grams of the ITO pigment, similar to the ITO pigment of Example 11, (wherein the pigment was previously heat-treated at 600° C. for six hours in a reduced pressure atmosphere of $5 \times 10^{-2}$ torr and cooled to room temperature) was immersed in 20 grams of methyl ethyl ketone at room temperature for ten minutes. Surface modification treatment of the pigment included cooling the pigment to room temperature, after it had been dried in a reduced pressure atmosphere at a temperature of 300° C. for ten minutes.

After the surface modification treatment, the ITO pigment exhibited an oxygen vacancy of 0.226 mol, a specific surface area of 68.0 $m^2/g$, a primary particle size ranging from about 0.009 to 0.027 μm, a surface acidity of $3.0 \times 10^{-6}$ mol/$m^2$, a volume resistivity of $8.5 \times 10^{-3}$ Ω.cm, and a color tone comprising an x-value of 0.2972 and a y-value of 0.3068 relative to visible rays on the xy chromaticity scale.

By contrast, the ITO pigment obtained in Example 11, before surface modification treatment exhibited a surface basicity of $6.0 \times 10^{-6}$ mol/$m^2$.

EXAMPLE 18

50 grams of the ITO pigment of Example 12, which had been heat-treated at 300° C. for 6 hours in an $N_2$ atmosphere and cooled to room temperature, was immersed in 20 grams of ethyl acetate at room temperature for 10 minutes. The ITO pigment was subjected to surface modification which included heat-treatment at 300° C. for 10 minutes in an $N_2$ atmosphere in a silica tube, followed by cooling to room temperature.

After the surface modification treatment, the ITO pigment was examined. Upon examination, the ITO pigment revealed an oxygen vacancy of 0.071 mol, a specific surface area of 67.0 $m^2/g$, a primary particle size ranging from about 0.009 to 0.027 μm, a surface acidity of $1.1 \times 10^{-6}$ mol/$m^2$, a volume resistivity of $8.7 \times 10^{-3}$ Ω.cm, and a color tone comprising an x-value of 0.2970 and a y-value of 0.3025 relative to visible rays on the xy chromaticity scale.

By contrast, the ITO pigment obtained in the Example 12, exhibited a surface basicity of $4.5 \times 10^{-7}$ mol/$m^2$ before the surface modification treatment.

EXAMPLE 19

50 grams of the ITO pigment was obtained in a manner similar to Example 13, wherein the ITO pigment had been heat-treated at 1,150° C. for 3 hours in an $N_2$ atmosphere and cooled to room temperature. This ITO pigment was then heat-treated again at 150° C. for 1 hour in a mixed gas flow of 50 ml/min of CO+950 ml/min of $N_2$ in a silica tube, and cooled to room temperature as part of its surface modification treatment.

After the surface modification treatment, the ITO pigment showed an oxygen vacancy of 0.321 mol, a specific surface area of 1.4 $m^2/g$, a primary particle size ranging from about 0.36 to 0.58 μm, a surface acidity of $3.4 \times 10^{-6}$ mol/$m^2$, a volume resistivity of $2.5 \times 10^{-4}$ Ω.cm, and a color tone comprising an x-value of 0.2855 and a y-value of 0.3052 relative to visible rays on the xy chromaticity scale.

By contrast, the ITO pigment obtained in the Example 12, exhibited a surface basicity of $4.5 \times 10^{-7}$ mol/m$^2$ before the surface modification treatment.

EXAMPLE 20

100 grams of an In/Sn co-precipitated hydroxide (already washed and dried) (ITO precursor hydroxide), having an Sn content of 14.24 mol % was obtained in the manner similar to Example 6 except that the amount of aqueous 55% SnCl$_4$ solution was changed from 95 grams to 137 grams. The thus obtained co-precipitated hydroxide was heat-treated at 400° C. for 3 hours in a mixed gas flow comprising 10 ml/min of H$_2$+990 ml/min of N$_2$ in a silica tube, and then cooled to room temperature to provide a grey-blue ITO pigment.

It was observed, that this pigment contained only Si, Ca and Na metal element as impurities ranging from about 1 to 50 ppm, respectively, with a Cl content of 8 ppm. This pigment also had an oxygen vacancy of 0.315 mol, a surface acidity of $3.0 \times 10^{-6}$ mol/m$^2$, a specific surface area of 74.5 m$^2$/g, a primary particle size ranging from about 0.011 to 0.021 μm, a volume resistivity of $8.8 \times 10^{-3}$ Ω.cm, and a color tone comprising an x-value of 0.2983 and a y-value of 0.3020 relative to visible rays on the xy chromaticity scale.

By contrast, the non-treated ITO pigment obtained in Example 14 by calcining the same co-precipitate hydroxide as that used as the raw material in this Example at 1,150° C. for 3 hours, in open air, showed a surface basicity of $5.9 \times 10^{-6}$ mol/m$^2$.

EXAMPLE 21

50 grams of an In/Sn co-precipitate hydroxide (already water-washed and dried), having an Sn content of 6.07 mol %, which had been prepared in the Example 15 as an ITO precursor hydroxide, was heat-treated at 700° C. for three hours in a mixed gas flow comprising 5 ml/min NH$_3$+995 ml/min of N$_2$ in a silica tube, and then cooled to room temperature to provide a grey-blue ITO pigment.

The thus-obtained ITO pigment had the same impurity contents as the ITO pigment of Example 15. This pigment exhibited an oxygen vacancy of 0.306 mol, a surface acidity of $3.6 \times 10^{-6}$ mol/m$^2$, a specific surface area of 37 m$^2$/gm$^2$/g, a primary particle size ranging from about 0.015 to 0.032 μm, a volume resistivity of $7.9 \times 10^{-4}$ Ωcm, and a color tone comprising an x-value of 0.2915 and a value of 0.3041 relative to visible rays on the xy chromaticity scale.

By contrast, the non-treated ITO pigment obtained in the Example 15, which was obtained by calcining the same co-precipitate as that used as the raw material in this Example at 750° C. for 4 hours in open air exhibited a surface basicity of $2.9 \times 10^{-6}$ mol/m$^2$.

EXAMPLE 22

50 grams of an In/Sn co-precipitate hydroxide (already water-washed and dried), having an Sn content of 4.2 mol %, similar to the one prepared in Example 9 as an ITO precursor hydroxide, was heat-treated at 800° C. for 4 hours in a N$_2$ atmosphere in a silica tube, and then cooled to the room temperature to provide a grey-blue ITO pigment.

The thus-obtained ITO pigment was subsequently subjected to a surface modification treatment. The treatment consisted of immersing the ITO pigment in 10 grams of isophorone at room temperature for 10 minutes. This was followed by drying the ITO pigment in a reduced pressure atmosphere ($10^{-3}$ torr) at 150° C. for 20 minutes, and then cooling to room temperature.

After the surface modification treatment, the ITO pigment was analyzed. The resultory ITO pigment was characterized as having an oxygen vacancy of 0.211 mol, a specific surface area of 12.0 m$^2$/g, a primary particle size ranging from about 0.031 to 0.089 μm, a surface acidity of $3.7 \times 10^{-5}$ mol/m$^2$, a volume resistivity of $9.7 \times 10^{-5}$ Ω.cm, and a color tone comprising an x-value of 0.2853 and a y-value of 0.3031 relative to visible rays on the xy chromaticity scale.

By contrast, the ITO, before the surface modification treatment, exhibited a surface basicity of $2.2 \times 10^{-6}$ mol/m$^2$, and a surface acidity of $5.9 \times 10^{-7}$ mol/m$^2$. Thus, it is clear that application of the surface modification treatment after oxygen extraction provided an ITO pigment characterized by a remarkably decreased resistance when compared to the ITO pigment of Example 9.

COMPARATIVE EXAMPLE 2

The steps of example 21 were repeated except that the heat treatment was carried out with the use of a mixed gas flow comprising 300 ml/min of NH$_3$ +(plus) 700 ml/min of N$_2$.

During the heat treatment step, part of In$_2$O$_3$ was reduced into metal In and welded together. A fine powdery ITO pigment could not therefore be obtained.

According to the present invention, it is possible to obtain a low/reduced-resistance conductive pigment having a surface acidity ranging from about $8 \times 10^{-7}$ to about $1 \times 10^{-5}$ mol/m$^2$ and a volume resistivity of under $2 \times 10^0$ which can be substantially reduced to at least $2 \times 10^{-2}$ Ω.cm. This can be achieved by means of a surface modification treatment which substantially increases surface acidity.

Additionally, the present invention provides a conductive pigment with reduced resistance and excellent visibility imparted by a bluish tone. This feature is achieved by means of an oxygen extraction step, wherein, the oxygen vacancy is adjusted to a range of from about 0.05 to 0.35 mol, a color tone comprising an x-value of from 0.265 to 0.300 and a y-value of from 0.290 to 0.315 relative to visible rays on the xy chromaticity scale, and a volume resistivity ranging from about $8 \times 10^{-1}$ to $1 \times 10^{-2}$ Ω.cm is achieved. This is made possible by the application of a heat treatment step which permits oxygen extraction from the conventional ITO pigment.

Furthermore, application of both of the above-described treatment permits achievement of both an increase in surface acidity and oxygen extraction, making it possible to obtain a high-performance ITO pigment with excellent visibility and a substantially reduced resistance. The high-performance ITO pigment is characterized by a surface acidity ranging from about $8 \times 10^{-7}$ to $1 \times 10^{-5}$ mol/m$^2$, an oxygen vacancy ranging from about 0.05 to 0.35 mol, a color tone comprising an x-value of from 0.265 to 0.300 and a y-value of from 0.290 to 0.315, and a volume resistivity ranging from about $8 \times 10^{-2}$ to $9 \times 10^{-5}$ Ω.cm.

In summary, this invention aims at providing a conductive film with excellent visibility and a blue tint, unlike conventional yellowish sputtering films. Additionally, the conductive film of the present invention exhibits low resistance similar to a prior art sputtering film, by using such simple means as one of application and printing without the added cost of wasted indium, which is comparatively expensive.

Particularly when the average primary particle size of an ITO pigment is up to 0.2 µm, a transparent conductive film exhibiting superior visibility is formed. This transparent conductive film is useful as a transparent electrode for a liquid-crystal display, an automotive wind-breaking glass, and a heating element with transparent surface for a window.

What is claimed is:

1. A conductive pigment, comprising:

indium oxide crystal grains each including a partial amount of Sn;

said partial amount being from about 1 to about 15 mol % of a total amount of Sn and In in each of said indium oxide crystal grains;

said conductive pigment having a surface acidity in a range from about $8 \times 10^{-7}$ to about $1 \times 10^{-5}$ mol/m$^2$; and said conductive pigment having a volume resistivity in a range from $2 \times 10^0$ Ω.cm to $2 \times 10^{-2}$ Ω.cm.

2. The conductive pigment as claimed in claim 1, wherein said conductive pigment has an average primary particle size of up to 0.2 µm.

3. A conductive pigment, comprising:

indium oxide crystal grains each including a partial amount of Sn;

said partial amount being from about 1 to about 15 mol % of a total amount of Sn and In in each of said indium oxide crystal grains;

said indium oxide crystal grains each having an oxygen vacancy ranging from about 0.05 to 0.35 mol per mol of said indium oxide crystal grains;

said conductive pigment having a color tone of pigment relative to visible ray ranging from about 0.265 to 0.300 in terms of x-value and from 0.290 to 0.315 in terms of y-value on the xy chromaticity scale;

said conductive pigment has an average primary particle size of up to 0.2 µm; and said conductive pigment having a volume resistivity, as measured by the four-probe method on 50 kg/cm$^2$ green compact, ranging from about $8 \times 10^{-1}$ to $1 \times 10^{-2}$ Ω.cm.

4. A conductive pigment, comprising:

indium oxide crystal grains each including a partial amount of Sn;

said partial amount being in a range of from about 1 to about 15 mol % relative to a total amount of Sn and In in each of said indium oxide crystal grains;

said conductive pigment having a surface acidity in a range from about $8 \times 10^{-7}$ to about $1 \times 10^{-5}$ mol/m$^2$;

said conductive pigment having an average primary particle size up to 0.2 µm;

said indium oxide crystal grains each having an oxygen vacancy ranging from about 0.05 to 0.35 mol per mol of said indium oxide crystal grains;

said conductive pigment having a color tone of pigment relative to visible ray ranging from about 0.265 to 0.300 in terms of x-value and from 0.290 to 0.315 in terms of y-value in the xy chromaticity scale; and said conductive pigment having a volume resistivity, as measured by the four-probe method on 50 kg/cm$^2$ green compact, ranging from about $8 \times 10^{-2}$ to $9 \times 10^{-5}$ Ω.cm.

5. A method of manufacturing a conductive pigment, comprising the steps of:

immersing indium oxide crystal grains each including Sn in a range of from about 1 to about 15 mol % relative to a total amount of Sn and In in each of said indium oxide crystal grains into at least an organic solvent selected from the group consisting of alcohol, ketone, ester and amine;

said alcohol includes at least one alcohol selected from the group consisting of methanol, ethanol, propanol, isopropanol, 1-butanol, 2-butanol, isobutanol, tertbutyl alcohol, hexanol, cyclohexanol, ethylene glycol, butoxyethanol, and 2-(2-butoxy)ethanol;

said ketone includes at least one ketone selected from the group consisting of acetone, methylethylketone, methylisobutylketone, 4-hydroxy-4-methyl-2-pentanone, cyclohexanone, isoholon, and diacetone alcohol;

said ester includes at least one member selected from the group consisting of ethyl acetate, butyl acetate, and butylcarbitol acetate;

said amine includes at least one amine selected from the group consisting of dimethylamine, tributylamine, ethanol amine, dimethylformamide, hydroxytetra-n-butyl-ammonium, trimethylamine, dimethyl-sec-butylamine, cyclohexylamine, and ethylenediamine; and heat-treating said indium oxide crystal grains at a temperature of up to 500° C. under one of a reduced pressure and an inert gas atmosphere, sufficient to yield a color tone of pigment relative to visible ray ranging from about 0.265 to 0.300 in terms of x-value and from 0.290 to 0.315 in terms of y-value in the xy chromaticity scale.

6. A method of manufacturing a conductive pigment, comprising the steps of:

heat-treating indium oxide crystal grains which include Sn, in a range of from about 1 to about 15 mol % relative to a total amount of said Sn and In, at a temperature of up to 500° C. in an inert gas atmosphere containing at least one member selected from the group consisting of hydrogen, ammonia and carbon monoxide in an amount ranging from about 0.5 to 20 vol. % sufficient to yield a color tone of pigment relative to visible ray ranging from about 0.265 to 0.300 in terms of x-value and from 0.290 to 0.315 in terms of y-value in the chromaticity scale.

7. A method of manufacturing a conductive pigment, comprising the steps of:

heat-treating at least one of an indium oxide crystal grains and precursor hydroxides thereof, both including Sn, in a range of from about 1 to about 15 mol % relative to a total amount of Sn and In at a temperature ranging from about 300° to about 1,150° C. in at least one of a reduced pressure atmosphere and an inert gas atmosphere, sufficient to yield a surface acidity in a range from about $8 \times 10^{-7}$ to about $1 \times 10^{-5}$ mol/m$^2$.

8. A method of manufacturing a conductive pigment, comprising the steps of:

heat-treating at least one of an indium oxide crystal grains and precursor hydroxides thereof, both including Sn, in a range of from about 1 to about 15 mol % relative to a total amount of Sn and In at a temperature ranging from about 300° to about 1,150° C. in at least one of a reduced pressure atmosphere and an inert gas atmosphere;

immersing resultory heat treated material, both including Sn, into at least one organic solvent selected from the group consisting of alcohol, ketone, ester and amine; and heat-treating resultory indium oxide crystal grains and oxides thereof, both including Sn, at a temperature of up to 500° C. in at least one of a reduced pressure atmosphere and an inert gas atmosphere, sufficient to yield a color tone of pigment relative to visible ray ranging from about 0.265 to 0.300 in terms of x-value and from 0.290 to 0.315 in terms of y-value in the xy chromaticity scale.

9. A method of manufacturing a conductive pigment, comprising the steps of:

heating at least one of an indium oxide crystal grains and precursor hydroxides thereof;

said at least one of indium oxide crystal grains and precursor hydroxides thereof including from about 1 to about 15 mol % of Sn relative to a total amount of Sn and In at a temperature ranging from about 300° to about 1,150° C. in at least one of a reduced pressure atmosphere and an inert gas atmosphere; and heat-treating resultory indium oxide crystal grains and oxides thereof, both including Sn, sufficient to yield a surface acidity in a range from about $8 \times 10^{-7}$ to about $1 \times 10^{-5}$ mol/m$^2$, at a temperature of up to 500° C. in an inert gas atmosphere containing at least one selected from the group consisting of $H_2$, $NH_3$ and CO in an amount ranging from about 0.5 to 20 vol. %.

10. A method of manufacturing a conductive pigment, comprising the steps of:

heat-treating at least one of an indium oxide crystal grains and precursor hydroxides thereof, both including Sn, in a range of from about 1 to about 15 mol % relative to a total amount of Sn and In at a temperature ranging from about 300° to about 1,150° C. in an inert gas atmosphere containing at least one selected from the group consisting of $H_2$, $NH_3$ and CO in an amount ranging from about 0.5 to 20 vol. %, sufficient to yield a color tone of pigment relative to visible ray ranging from about 0.265 to 0.300 in terms of x-value and from 0.290 to 0.315 in terms of y-value in the xy chromaticity scale.

11. The conductive pigment as claimed in claim 1, wherein said conductive pigment has an average primary particle size of from 0.01 to 0.1 μm.

12. The conductive pigment as claimed in claim 3, wherein said conductive pigment has an average primary particle size of from 0.01 to 0.1 μm.

13. The method of manufacturing a conductive pigment according to claim 10, wherein said inert gas atmosphere includes from about 1 to about 10 vol % of said at least one member selected from the group consisting of $H_2$, $NH_3$ and CO.

* * * * *